United States Patent
Lalancette (10) Patent No.: US 10,541,522 B2
(45) Date of Patent: Jan. 21, 2020

(54) ELECTRICAL BOX BAR HANGER

(71) Applicant: Thomas & Betts International LLC, Wilmington, DE (US)

(72) Inventor: Daniel Lalancette, Saint-Jean-sur-Richelieu (CA)

(73) Assignee: Thomas & Betts International LLC, Wilmington, DE (US)

( * ) Notice: Subject to any disclaimer, the term of this patent is extended or adjusted under 35 U.S.C. 154(b) by 22 days.

(21) Appl. No.: 15/804,232

(22) Filed: Nov. 6, 2017

(65) Prior Publication Data

US 2018/0138679 A1    May 17, 2018

Related U.S. Application Data

(60) Provisional application No. 62/422,149, filed on Nov. 15, 2016.

(51) Int. Cl.
| | |
|---|---|
| *H02G 3/12* | (2006.01) |
| *H02G 3/38* | (2006.01) |
| *F16M 13/02* | (2006.01) |
| *F21V 21/22* | (2006.01) |
| *H02G 3/04* | (2006.01) |
| *E04B 9/00* | (2006.01) |

(52) U.S. Cl.
CPC .......... *H02G 3/125* (2013.01); *F16M 13/027* (2013.01); *F21V 21/22* (2013.01); *H02G 3/0456* (2013.01); *H02G 3/281* (2013.01); *H02G 3/381* (2013.01); *E04B 9/006* (2013.01)

(58) Field of Classification Search
CPC ...... F16M 13/027; H02G 3/125; H02G 3/281; H02G 3/381; E04B 9/006

USPC .............................. 248/200.1, 343, 546, 547
See application file for complete search history.

(56) References Cited

U.S. PATENT DOCUMENTS

| | | | |
|---|---|---|---|
| 2,023,083 A | * | 12/1935 | Knell ..................... H02G 3/126 220/3.9 |
| 2,528,418 A | | 10/1950 | Buckets |
| 2,809,002 A | | 10/1957 | Rudolph |
| 2,917,263 A | | 12/1959 | Appleton et al. |
| 2,945,661 A | | 7/1960 | Appleton |
| 2,963,253 A | | 12/1960 | Maier et al. |
| 2,964,279 A | * | 12/1960 | Galloway .............. H02G 3/126 248/217.3 |
| 3,104,087 A | | 9/1963 | Budnick et al. |
| 3,518,421 A | | 6/1970 | Cogdill |
| 4,062,512 A | | 12/1977 | Arnold |
| 4,165,851 A | | 8/1979 | Bowden, Jr. et al. |

(Continued)

*Primary Examiner* — Eret C McNichols
(74) *Attorney, Agent, or Firm* — Taft Stettinius & Hollister LLP; J. Bruce Schelkopf (57) ABSTRACT

An electrical box bar hanger includes an adjustable channel having a plurality of locking tabs at distal ends thereof and first and second end plates with each of the first and second end plates having a plurality of locking apertures thereon. The first and second end plates are integrally connected to each distal end of the adjustable channel. When each end plate is bent 90 degrees against each corresponding end of the adjustable channel, each of the plurality of locking apertures aligns with each corresponding locking tab, such that the plurality of locking tabs can be inserted into corresponding locking aperture to allow the first and second end plates to be perpendicular with the adjustable channel without the use of welding.

18 Claims, 8 Drawing Sheets

(56) References Cited

U.S. PATENT DOCUMENTS

| | | | | |
|---|---|---|---|---|
| 4,391,428 | A * | 7/1983 | Grimes | F24F 13/32 248/27.1 |
| 4,967,990 | A | 11/1990 | Rinderer | |
| 5,044,582 | A * | 9/1991 | Walters | H02G 3/126 248/200.1 |
| 5,386,959 | A | 2/1995 | Laughlin et al. | |
| 5,938,157 | A | 8/1999 | Reiker | |
| 5,954,304 | A * | 9/1999 | Jorgensen | H02G 3/125 248/200.1 |
| 6,889,943 | B2 * | 5/2005 | Dinh | B60N 2/073 248/343 |
| 7,040,586 | B2 * | 5/2006 | Kusber | H02G 3/30 248/200.1 |
| 7,255,315 | B2 * | 8/2007 | Oh | A62C 35/68 169/43 |
| 7,355,118 | B1 | 4/2008 | Gretz | |
| 7,381,893 | B2 * | 6/2008 | Kerr, Jr. | H02G 3/125 174/50 |
| 7,510,159 | B2 * | 3/2009 | Rippel | H02G 3/125 248/323 |
| 7,673,841 | B2 * | 3/2010 | Wronski | F21V 21/048 248/200.1 |
| 7,857,275 | B2 * | 12/2010 | de la Borbolla | H02G 3/125 174/58 |
| 8,091,721 | B1 * | 1/2012 | Gretz | H02G 3/20 220/3.9 |
| 8,109,482 | B2 * | 2/2012 | Oh | A62C 35/68 248/342 |
| 8,177,176 | B2 * | 5/2012 | Nguyen | E04B 9/006 248/200.1 |
| 8,336,843 | B2 * | 12/2012 | Gulbrandsen | E04B 9/065 24/536 |
| 8,474,199 | B2 * | 7/2013 | Oh | A62C 35/68 248/343 |
| 9,435,353 | B1 * | 9/2016 | Gretz | F04D 29/601 |
| 9,583,926 | B2 * | 2/2017 | Ye | H02G 3/125 |
| 9,696,021 | B2 * | 7/2017 | Wronski | F21V 21/22 |
| 9,929,549 | B2 * | 3/2018 | Witherbee | F16M 13/022 |
| 10,006,613 | B2 * | 6/2018 | Oudina | F21V 21/048 |
| 2003/0029983 | A1 * | 2/2003 | Pfaller | H02G 3/125 248/343 |
| 2005/0045793 | A1 * | 3/2005 | Johnson | F04D 29/601 248/343 |
| 2005/0098697 | A1 | 5/2005 | Collins | |
| 2005/0247842 | A1 * | 11/2005 | Wronski | F21V 21/04 248/323 |
| 2012/0097406 | A1 * | 4/2012 | Silcox | A62C 35/68 169/51 |
| 2014/0238717 | A1 * | 8/2014 | Korcz | F16M 13/027 174/50 |
| 2017/0229852 | A1 * | 8/2017 | Jones | E04C 3/32 |

* cited by examiner

FIG. 9

ELECTRICAL BOX BAR HANGER

CROSS REFERENCE TO RELATED APPLICATION

This application claims priority to U.S. Provisional Patent Application No. 62/422,149, filed on Nov. 15, 2016, the contents of which are incorporated herein by reference in its entirety.

FIELD OF THE INVENTION

The present invention relates to bar hangers, and more particularly, to electrical box bar hangers configured to suspend between ceiling structures so as to provide support for an electrical box.

BACKGROUND OF THE INVENTION

An electrical box bar hanger supports an electrical box that needs to be secured between ceiling structures. Generally, each of the electrical box bar hangers currently available in the market includes a channel, having telescopically engaged inner and outer bar members, and a pair of end plates that are secured to each distal end of the channel. These end plates are typically secured to each distal end of the channel by welding. However, this welding operation is not always easy to perform/control and creates various quality issues during production such as the end plates not being perpendicular to the channel after the welding operation. Thus, the current method of attaching the end plates is difficult and costly since the process has to be repeated until the end plates are attached perpendicular to the channel.

Accordingly, although various electrical box bar hangers are available currently in the marketplace, further improvements are possible.

SUMMARY OF THE INVENTION

According to an embodiment of the present invention, an electrical box bar hanger includes an adjustable channel having a plurality of locking tabs at distal ends thereof and first and second end plates with each of the first and second end plates having a plurality of locking apertures thereon. The first and second end plates are integrally connected to each distal end of the adjustable channel. When each end plate is bent 90 degrees against each corresponding end of the adjustable channel, each of the plurality of locking apertures aligns with each corresponding locking tab, such that the plurality of locking tabs can be inserted into corresponding locking aperture to allow the first and second end plates to be perpendicular with the adjustable channel without the use of welding.

These and other aspects of the present invention will be better understood in view of the drawings and following detailed description.

DETAILED DESCRIPTION OF PREFERRED EMBODIMENTS

Figure 1:
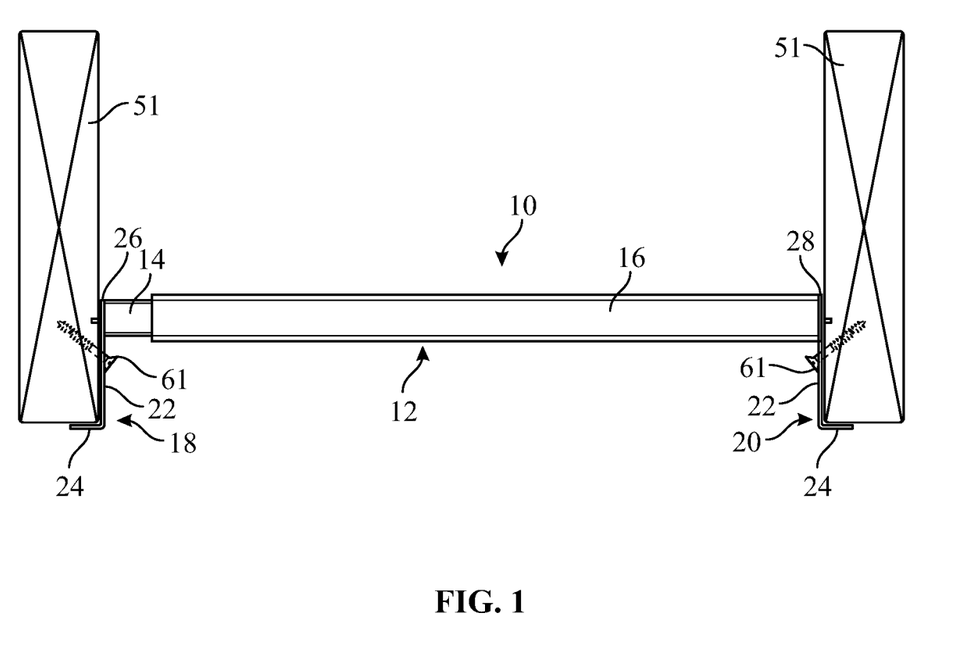
FIG. 1 is a side view of an electrical box bar hanger, according to an embodiment of the present invention, with end plates in a 90 degree configuration and secured to ceiling structures.

According to an embodiment of the present invention, referring to FIG. 1, there is shown an electrical box bar hanger 10 generally used for mounting and securing an electrical device, such as a lighting fixture, to a ceiling. The electrical box bar hanger 10 includes a telescopically adjustable channel 12 having an inner channel member 14 and an outer channel member 16, and a first end plate 18 and a second end plate 20, with each of the end plates 18, 20 having a plate portion 22 and a leg portion 24. The first end plate 18 and the second end plate 20 are positioned at distal ends 26, 28 of the adjustable channel 12, as will be described in greater detail below.

Directional terms, such as top, bottom, and side are referenced to an orientation in which the electrical box bar hanger 10 is secured to a ceiling with the leg portion 24 of each of the end plates 18, 20 facing downwards. However, the present invention is not thereby limited to use in any particular orientation.

Figure 2:
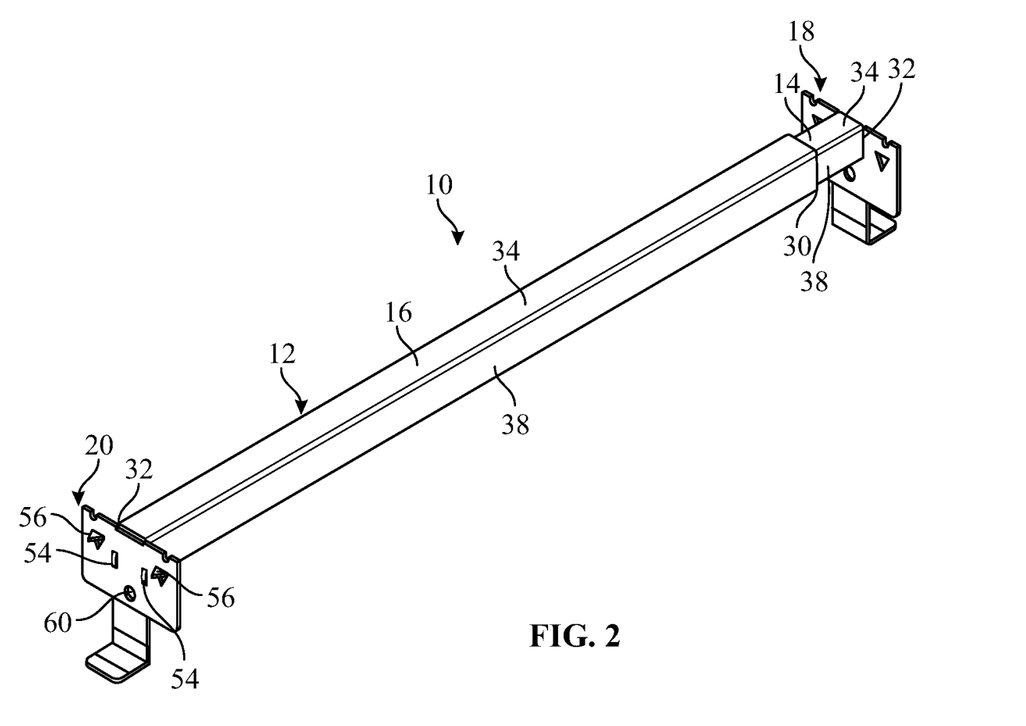
FIG. 2 a top perspective view of the electrical box bar hanger in FIG. 1.
Figure 3:
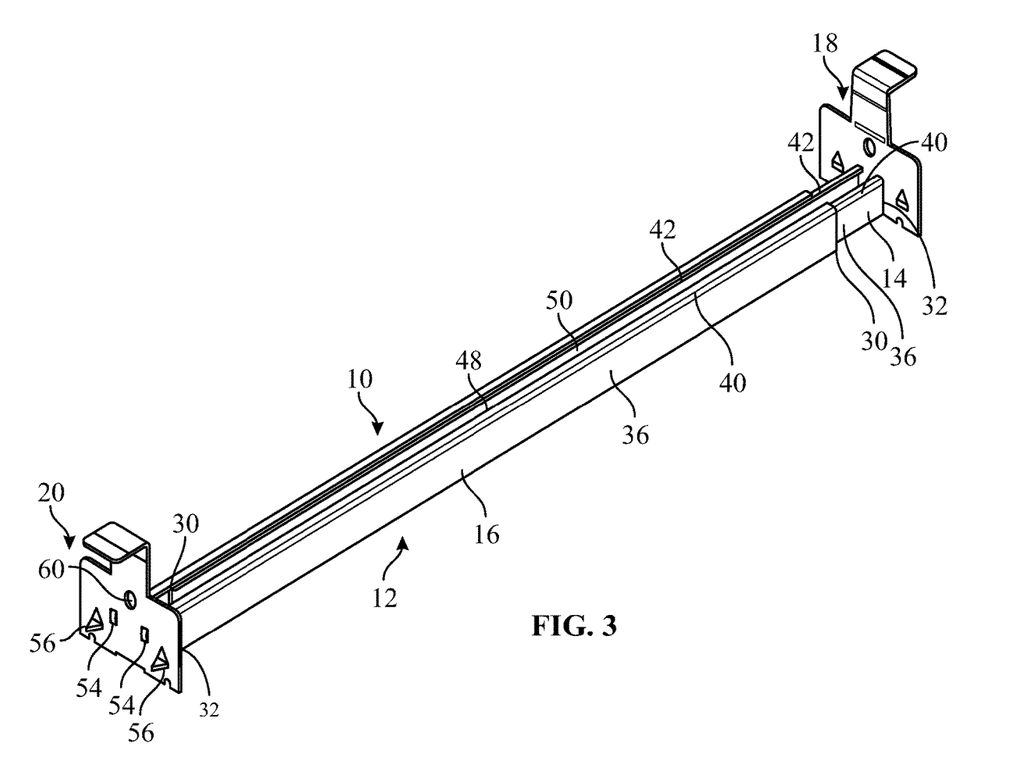
FIG. 3 is a bottom perspective view of the electrical box bar hanger in FIG. 1.

Referring to FIGS. 2 and 3, each of the inner and outer channel members 14, 16 is an elongated strut extending between an inner end 30 and an outer end 32, which includes a base 34, first and second opposed side walls 36, 38 connected and separated by the base 34, and first and second inturned members 40, 42. The first and second side walls 36, 38 are parallel and extend substantially perpendicular from the base 34. The first and second inturned members 40, 42 are disposed on the bottom of each of the inner and outer channel members 14, 16 and are connected to the first and second side walls 36, 38, respectively, thereby forming a bottom opening 48 therebetween. The base 34, first and second side walls 36, 38, and first and second inturned members 40, 42 form a cavity 50 along the entire length of each channel member 14, 16.

Contours of the inner and outer channel members 14, 16 are substantially identical except that the inner channel member 14 is slightly smaller, thereby allowing the inner channel member 14 to be fitted within the cavity 50 of the outer channel member 16 and slidable therewithin. In other words, the inner channel member 14 has a smaller rectangular cross section than the outer channel member 16 such that the inner channel member 14 can be slidably mounted for telescopic movement within the cavity 50 of the outer channel member 16. This telescopic movement allows the adjustable channel 12 to be retracted or extended. Thus, a desirable width of the adjustable channel 12 can be set to fit between ceiling structures 51 during installation of the electrical box bar hanger 10, as illustrated in FIG. 1.

Figure 4:
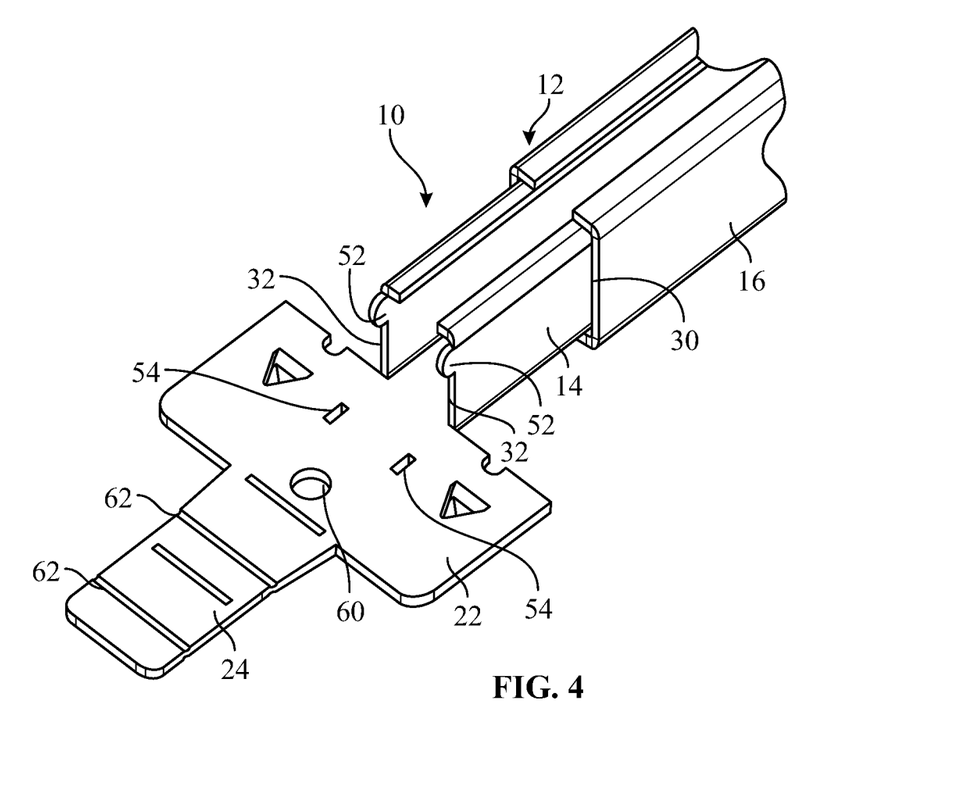
FIG. 4 is a partial view of the electrical box bar hanger in FIG. 1, before the end plate is bent 90 degrees against the edge of the adjustable channel.
Figure 5:
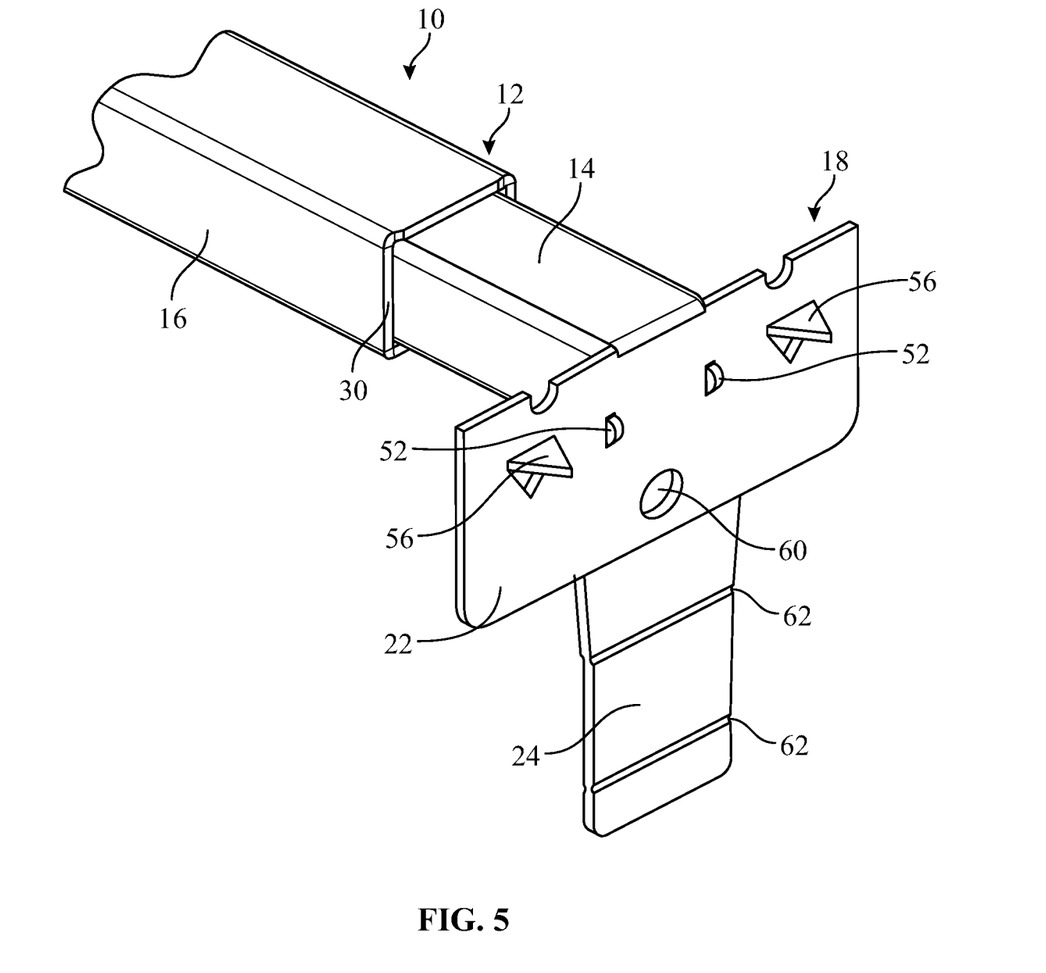
FIG. 5 is a partial view of the electrical box bar hanger in FIG. 1, with a leg portion of the end plate being straight.
Figure 8:
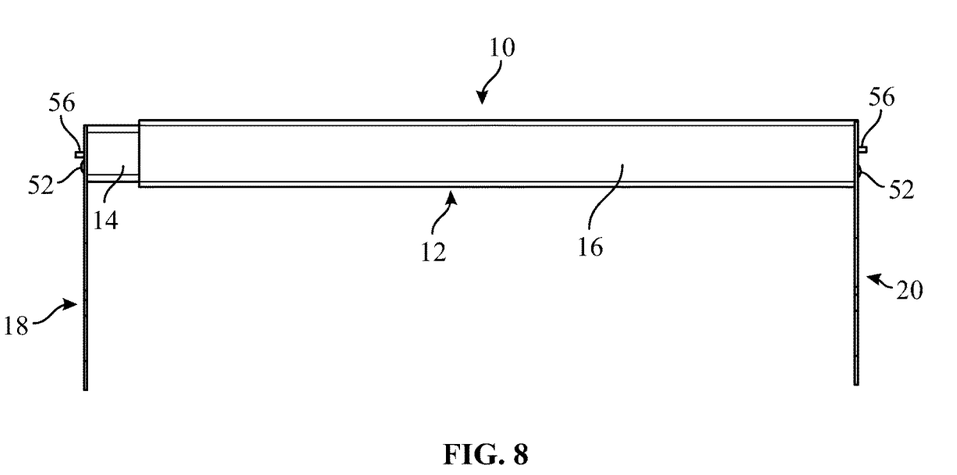
FIG. 8 is a side view of the electrical box bar hanger in FIG. 1, with the leg portion of each end plate being straight.

Referring to FIG. 4, there is shown a partial view of the electrical box bar hanger 10 before the end plate 18 is bent 90 degrees against the edge of the adjustable channel 12 during production. A plurality of semi-circular swagable locking tabs 52 are defined at each distal end 26, 28 of the adjustable channel 12 of the electrical box bar hanger 10. Specifically, the plurality of locking tabs 52 are integrally formed from the edge of the outer end 32 of each of the inner and outer channel members 14, 16 and protrude laterally therefrom, as illustrated in FIGS. 4, 5, and 8. The plurality of locking tabs 52 are configured to engage with the end plates 18, 20 such that each end plate 18, 20 can be maintained in a 90 degree configuration, as will be described in greater detail below.

It will be appreciated that other designs and configurations could be used for the plurality of locking tabs 52, as deemed suitable for given application factors. For example, each of the plurality of locking tabs 52 may have a rectangular shape and can be defined at any location along the edge of the outer end 32 of each of the inner and outer channel members 14, 16.

Figure 6:
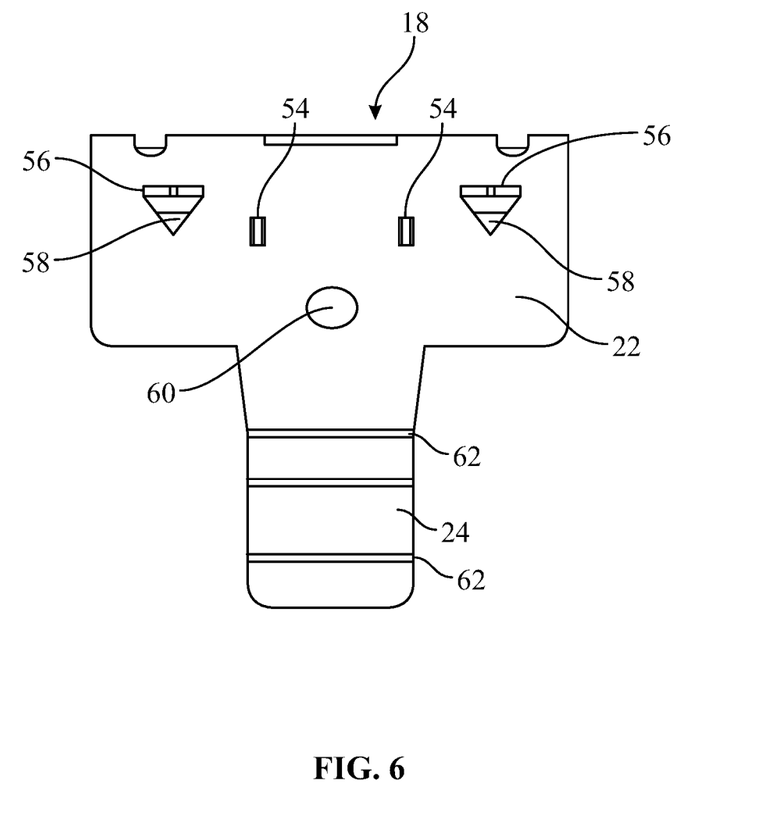
FIG. 6 is a front view of the end plate in FIG. 5.

The first end plate 18 and the second end plate 20 are integrally attached to each distal end 26, 28 of the adjustable channel 12 to allow the electrical box bar hanger 10 to be mounted and secured to the ceiling structures 51. Each of the first and second end plates 18, 20 has the generally planar plate portion 22 and the leg portion 24 extending downwardly from a middle section of the plate portion 22, as illustrated in FIG. 6. During production of the electrical box bar hanger 10, the first and second end plates 18, 20 are bent such that they are substantially perpendicular to the adjustable channel 12, as illustrated in FIG. 5.

Figure 7:
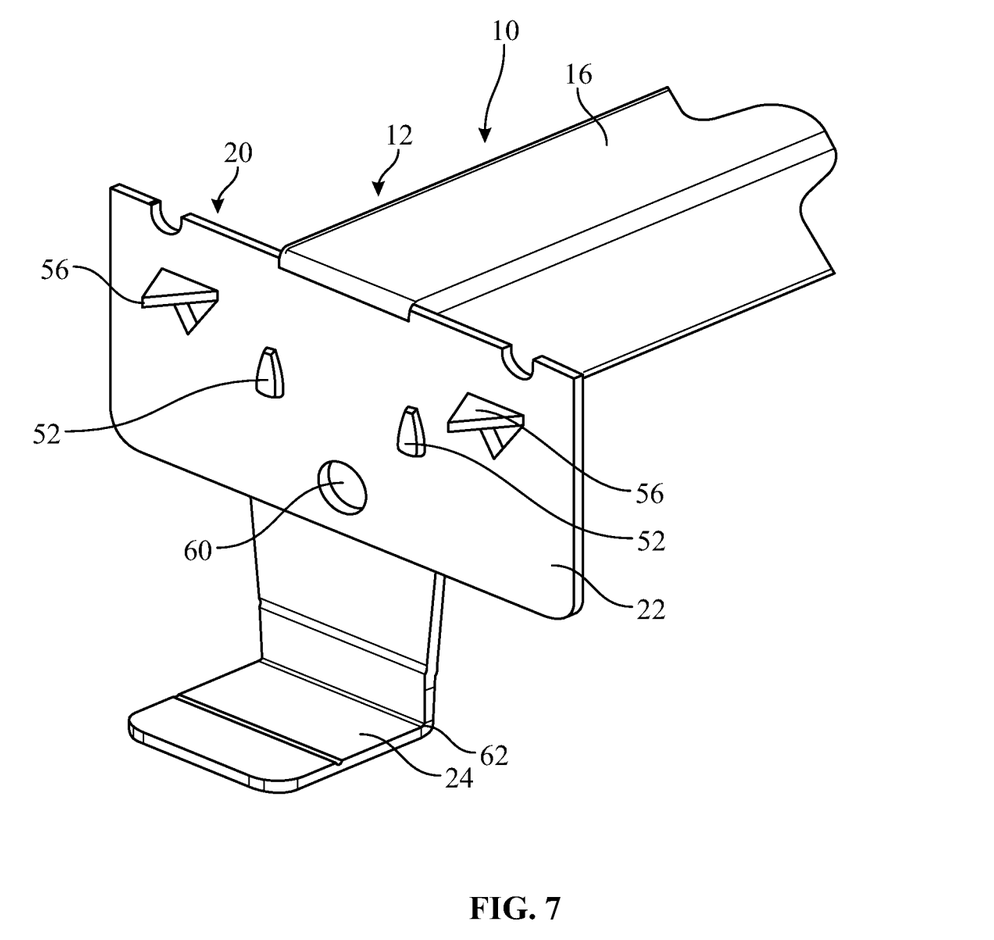
FIG. 7 is a partial view of the electrical box bar hanger in FIG. 1.

Referring to FIGS. 4-7, the plate portion 22 of each of the first and second end plates 18, 20 includes a plurality of locking apertures 54. The plurality of locking apertures 54 are positioned on the plate portion 22 such that, when the first and second end plates 18, 20 are bent 90 degrees against the edge of the outer end 32 of each of the inner and outer channel members 14, 16, they align with each corresponding locking tab 52, as illustrated in FIGS. 5 and 8. The plurality of locking apertures 54 and the plurality of locking tabs 52 are dimensioned such that each locking tab 52 could be tightly inserted into each corresponding locking aperture 54 during production of the electrical box bar hanger 10. Once each of the plurality of locking tabs 52 is inserted into each corresponding locking aperture 54, the plurality of locking tabs 52 are swaged, as shown in FIG. 7, with an appropriate tool, such as a forming tool (not shown), to secure the end plates 18, 20 in the 90 degree configuration, thereby preventing the end plates 18, 20 from springing back to their original planar position.

The plurality of locking tabs 52 and the plurality of locking apertures 54 in the present invention resolve prevalent manufacturing issues with hanger bars such as a costly welding operation for connecting the end plates to the channel 12. The welding operation is not always easy to perform/control and creates various quality issues during production such as the end plates not being perpendicular to the channel. Since the first end plate 18 and the second end plate 20 in the present invention are integrally connected to the distal ends 26, 28 of the adjustable channel 12 and secured in the 90 degree configuration via the plurality of locking tabs 52 and the plurality of locking apertures 54, there is no need for a costly and difficult welding operation.

Referring again to FIGS. 4-6, each of the first and second end plates 18, 20 further includes a plurality of prongs 56 to temporarily secure the electrical box bar hanger 10 to the ceiling structures 51. The plurality of prongs 56 are integrally formed from each end plate 18, 20 by pressing or stamping out therefrom. Accordingly, the plurality of prongs 56 extend outwardly from each end plate 18, 20 such that a plurality of prong openings 58 are defined immediately adjacent to each corresponding prong 56. When an installer applies force to the end plates 18, 20 with a tool such as a hammer during installation of the electrical box bar hanger 10, the plurality of prongs 56 can be inserted into the ceiling structures 51 for temporary installation. For permanent installation of the electrical box bar hanger 10, an attaching aperture 60 is defined on each of the first and second end plates 18, 20, through which a fastener 61, such as a nail or screw, could be inserted/tightened with an appropriate hardware to affix the electrical box bar hanger 10 to the ceiling structures 51, as illustrated in FIG. 1.

Figure 9:
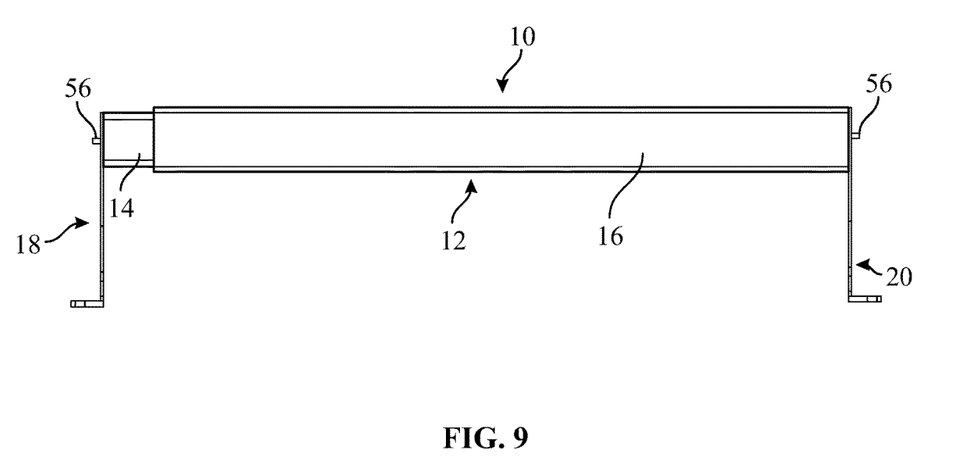
FIG. 9 is a side view of the electrical box bar hanger in FIG. 1.

Referring more particularly to FIG. 6, the leg portion 24 of each end plate 18, 20 includes a plurality of foldlines 62 along its length to help the installer with electrical box bar hanger 10 installation. For instance, the leg portion 24 can be bent outwardly at one of the plurality of foldlines 62 to provide a seat for properly positioning the electrical box bar hanger 10 for a given thickness of ceiling structure 51, as shown in FIG. 9. The installer can then easily position the electrical box bar hanger 10 by abutting each end plate 18, 20 to the surface of the ceiling structure 51.

The electrical box bar hanger 10 is made of one or more materials having suitable properties for a desired application, including strength, weight, rigidity, etc. Metal is generally preferred. The electrical box bar hanger 10, including the first and second end plates 18, 20, is formed as unitary pieces, for example, by stamping from a single sheet of metal. The adjustable channel 12 is created by bending up the sides of stamped metal sheet (not shown) to form the side walls 36, 38, while the end plates 18, 20 remain flat. The first and second end plates 18, 20 are then bent up perpendicularly to the distal ends 26, 28 of the adjustable channel 12, as described above.

From the foregoing, it will be appreciated that an electrical box bar hanger according to the present invention provides support for an electrical box, while reducing time and cost for installation.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. An electrical box bar hanger for securing an electronic box to a ceiling, the electrical box bar hanger comprising;
   an adjustable channel having a base, first and second opposed side walls connected and separated by the base, and a plurality of locking tabs at outer ends of the first and second side walls; and
   first and second end plates, each of the first and second end plates having a plurality of locking apertures thereon,
   wherein the first and second end plates are each integrally connected to the base at a corresponding outer end of the adjustable channel, and
   wherein each end plate is oriented 90 degrees from the base against the corresponding outer ends of the first and second opposed side walls of the adjustable channel and each of the plurality of locking apertures aligns with corresponding ones of the plurality of locking tabs, such that the plurality of locking tabs are inserted through the corresponding locking apertures to secure the first and second end plates in a perpendicular orientation against the corresponding outer ends of the first and second opposed side walls of the adjustable channel without the use of welding.

2. The electrical box bar hanger of claim 1, wherein the plurality of locking tabs are swaged to secure the first and second end plates against the corresponding outer ends of the first and second opposed side walls of the adjustable channel to prevent the first and second end plates from springing back to their original planar position.

3. The electrical box bar hanger of claim 1, wherein the adjustable channel includes an inner channel member and an outer channel member.

4. The electrical box bar hanger of claim 3, wherein each of the inner and outer channel members is an elongate strut extending between an inner end and an outer end and includes first and second inturned members extending from the first and second opposed side walls.

5. The electrical box bar hanger of claim 4, wherein the plurality of locking tabs are integrally formed from the edge of the outer end of each of the inner and outer channel members and protrude laterally therefrom.

6. The electrical box bar hanger of claim 4, wherein the base, first and second side walls, and first and second inturned members form a cavity along the entire length of each of the inner and outer channel members.

7. The electrical box bar hanger of claim 6, wherein the inner channel member has a smaller rectangular cross section than the outer channel member such that the inner channel member is slidably mounted for telescopic movement within the cavity of the outer channel member.

8. The electrical box bar hanger of claim 1, wherein each of the first and second end plates further includes a plurality of prongs, which extend outwardly from each end plate, for temporarily securing the electrical box bar hanger between ceiling structures.

9. The electrical box bar hanger of claim 8, wherein the plurality of prongs are integrally formed from each of the first and second end plates by pressing or stamping out therefrom.

10. The electrical box bar hanger of claim 1, wherein an attaching aperture is defined on each of the first and second end plates, through which a fastener such as a nail or screw could be inserted/tightened to affix the electrical box bar hanger to the ceiling structures.

11. The electrical box bar hanger of claim 1, wherein each of the first and second end plates includes a generally planar plate portion and a leg portion.

12. The electrical box bar hanger of claim 11, wherein the leg portion of each of the first and second end plates extends downwardly from a middle section of the plate portion.

13. The electrical box bar hanger of claim 11, wherein the leg portion of each of the first and second end plates includes a plurality of foldlines along its length.

14. The electrical box bar hanger of claim 11, wherein the leg portion of each of the first and second end plates can be bent outwardly at one of the plurality of foldlines to provide a seat for properly positioning the electrical box bar hanger for a given thickness of the ceiling structure.

15. The electrical box bar hanger of claim 1, wherein the plurality of the locking apertures and the plurality of locking tabs are dimensioned such that each locking tab could be tightly inserted into each corresponding locking aperture.

16. The electrical box bar hanger of claim 1, wherein the electrical box bar hanger is made out of metal.

17. The electrical box bar hanger of claim 1, wherein the electrical box bar hanger is formed by stamping from a single sheet of metal.

18. The electrical box bar hanger of claim 1, wherein each of the plurality of locking tabs has a semi-circular shape.

* * * * *